United States Patent [19]

Turner

[11] Patent Number: 5,734,543
[45] Date of Patent: Mar. 31, 1998

[54] METHOD AND APPARATUS TO IMPROVE THE PERFORMANCE OF AC SOLENOID DEVICES DURING LAPSES IN POWER QUALITY

[75] Inventor: Allen E. Turner, Clemson, S.C.

[73] Assignee: Clemson University, Clemson, S.C.

[21] Appl. No.: 622,758

[22] Filed: Mar. 27, 1996

[51] Int. Cl.[6] .................................................. H01H 47/32
[52] U.S. Cl. ........................................... 361/154; 361/187
[58] Field of Search ..................................... 361/152, 154, 361/187, 160, 205; 323/223, 224, 311

[56] References Cited

U.S. PATENT DOCUMENTS 4,356,526  10/1982  Russell .
4,368,499  1/1983   Stifter .
4,412,267  10/1983  Hansen .
4,415,943  11/1983  Wortman .

Primary Examiner—Fritz Fleming
Attorney, Agent, or Firm—Dority & Manning, P.A.

[57] ABSTRACT

A solenoid device, for example in an electrical contactor system, is provided for use with an alternating current power source. An electrical contactor includes an electromagnetic coil assembly configured to generate a non-zero effective magnetic force in response to an alternating current signal applied across the coil assembly. A switch proximate the coil assembly is configured to operate responsively to the effective magnetic force. A wave shaping device is configured to introduce a direct current component to an alternating current signal provided by the alternating current power source and to output at least part of the alternating current signal modified by the direct current component across the coil assembly.

26 Claims, 9 Drawing Sheets

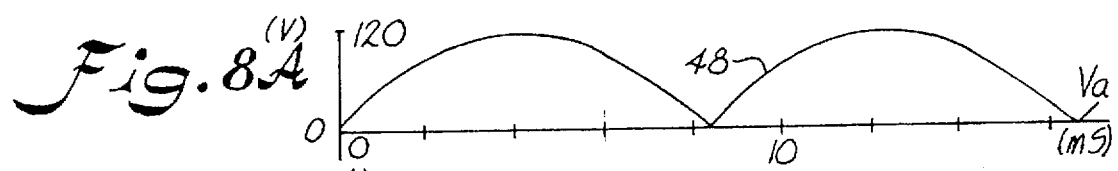
Fig. 8A
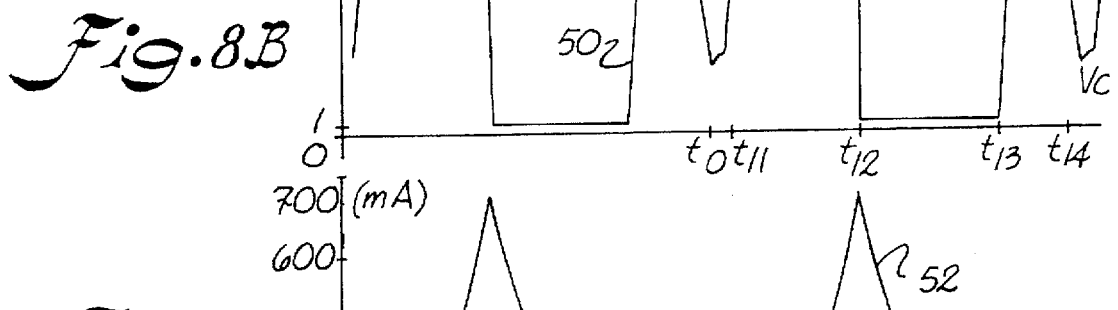
Fig. 8B
Fig. 8C
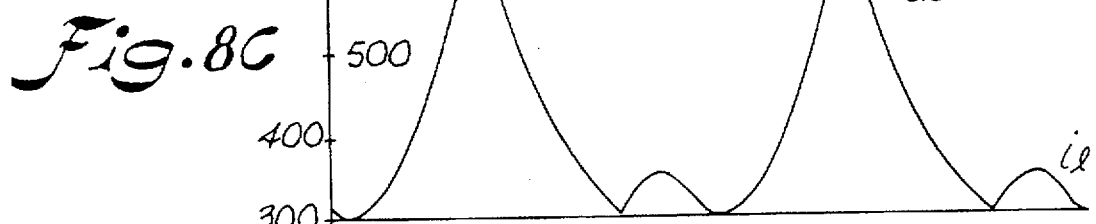
Fig. 8D
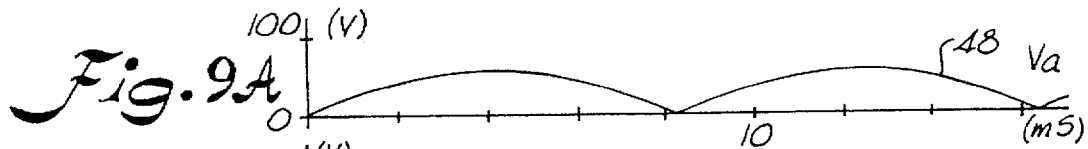
Fig. 9A
Fig. 9B
Fig. 9C
Fig. 9D
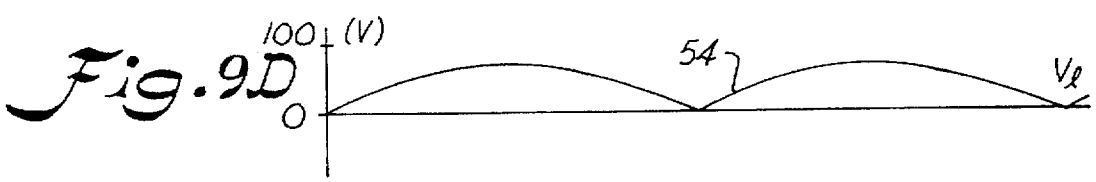

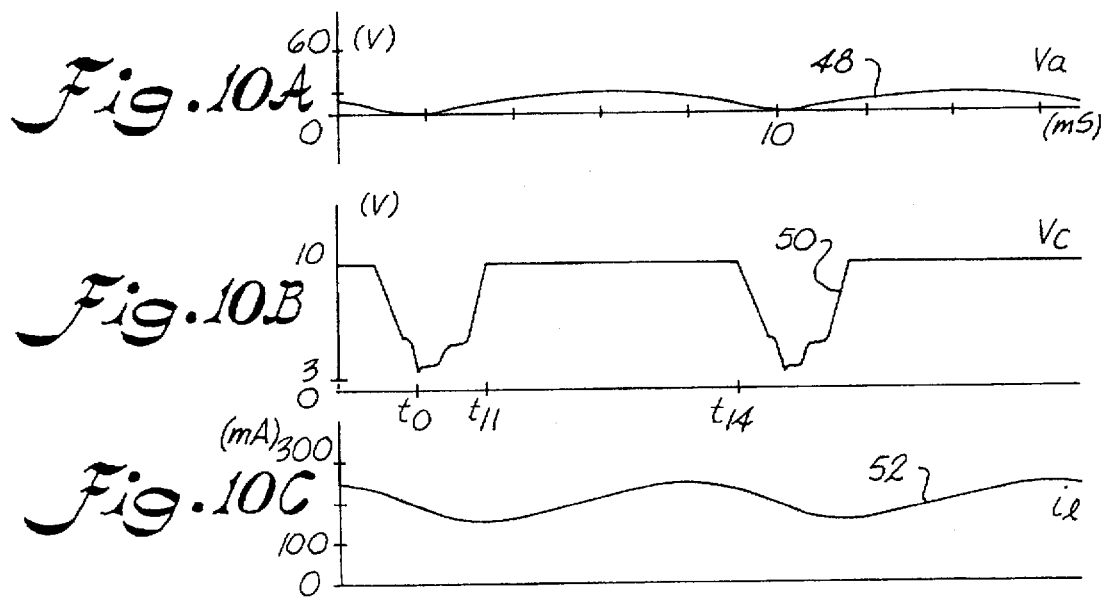
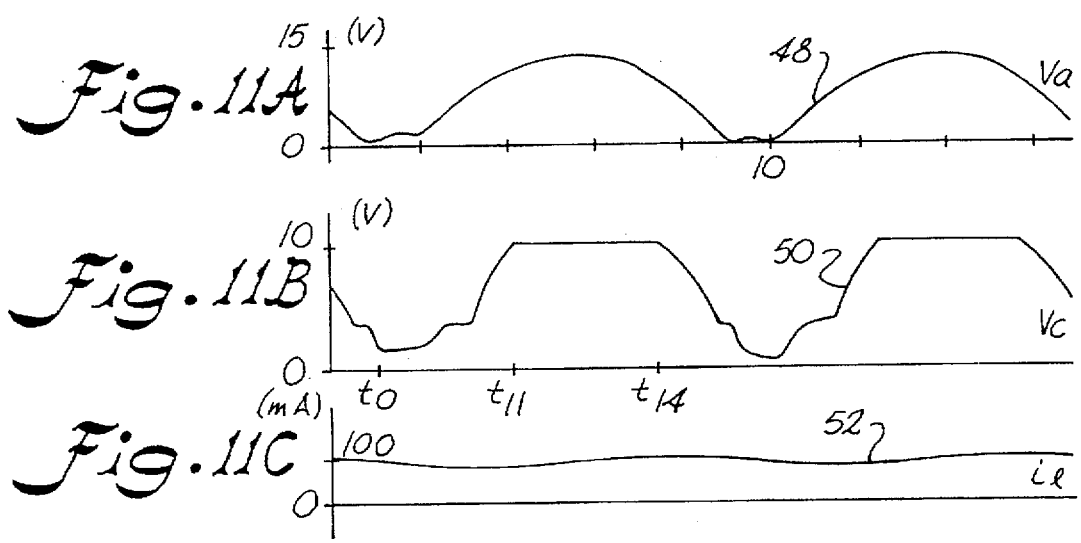

5,734,543

METHOD AND APPARATUS TO IMPROVE THE PERFORMANCE OF AC SOLENOID DEVICES DURING LAPSES IN POWER QUALITY

BACKGROUND OF THE INVENTION

The instant invention relates to a method and device to improve the performance of AC solenoid devices during lapses in power quality. In particular, the invention relates to a method and device to improve the performance of AC electrical contactors during lapses in power quality.

An electrical contactor is, generally, a form of solenoid switch that is used to connect and/or disconnect electrical circuits to and/or from each other. The contactor has an input signal that is used to energize an electromagnetic coil that provides the force to pull one or more electrical contacts together. More specifically, the input signal generates current flow in the coil which, in turn, induces a magnetic field to pull together two or more electrical contacts that are normally separated by spring tension. When current flows through the coil, the magnetic force overcomes the spring tension, maintaining contact between the electrical contacts. When the current stops, spring tension disengages the electrical contacts, and electrical continuity is terminated.

Electrical contactors are frequently used in industry as safety devices, often providing a switch between a power source and machinery which may be manually or automatically disengaged as needed.

A problem with AC electrical contactors is that periodic lapses in power quality, such as voltage sags, may cause the switch to undesirably open. Voltage sags are not uncommon. They may occur for various reasons and may cause, for example, a 30 volt to 40 volt drop in a 120 volt AC power source for a number of cycles.

Typically, the machinery which AC electrical contactors service would be able to successfully ride through such voltage sags if they were connected directly to the power source. Unfortunately, however, sags will often cause the contactor to disengage, thus causing the machinery to undesirably shut down. Furthermore, a voltage sag may cause some, but sometimes not all, electrical contactors in a facility to disengage. Such sporadic outages may cause, in turn, disruption of an assembly line process.

Based on the foregoing, it can be seen that a need exists for a device and method for improving the ride through capability of AC solenoid devices such as electrical contactors. In particular, it is desirable to improve the ride through capability so that an AC electrical contactor maintains the appropriate position of its associated switch until power to the contactor is intentionally disconnected, without undesirably changing switch position at the occurrence of a momentary voltage sag.

SUMMARY OF THE INVENTION

The present invention recognizes and addresses the foregoing disadvantages, and others of prior art construction and methods.

Accordingly, it is an object of the present invention to provide an improved AC solenoid device. More particularly, it is an object of the present invention to provide an AC electrical contactor having improved voltage sag ride through capability.

Some of these objects are achieved by a mechanism for improving the operating performance of a solenoid device during a lapse in power quality to the solenoid device from an alternating current power source. The mechanism comprises a wave shaping device configured to introduce a direct current component to an alternating current signal provided by the alternating current power source and to output at least part of the alternating current signal modified by the direct current component to the solenoid device.

In a performed embodiment, an electrical contactor system for use with an alternating current power source comprises an electrical contactor including an electromagnetic coil assembly configured to generate a non-zero effective magnetic force in response to an alternating current signal applied across the coil assembly. The system includes a switch proximate the coil assembly configured to operate responsively to the effective magnetic force.

The system also includes a wave shaping device configured to introduce a direct current component to an alternating current signal provided by the alternating current power source and to output at least part of the alternating current signal modified by the direct current component to the coil assembly. In preferred embodiments, the wave shaping device thereby generates an effective magnetic force greater than an effective magnetic force resulting from direct application of the alternating current signal to the coil assembly.

The addition of a DC component to the alternating current signal permits a greater effective magnetic force to be exerted on the switch than is generally present in conventional configurations. Thus, the contactor is able to withstand a more severe voltage drop before the effective magnetic force drops below the level required to maintain the operating position of the switch.

A solenoid device includes a coil across which may be applied an AC signal to produce a non-zero effective magnetic force. Those of ordinary skill in the art should understand that a solenoid device, such as may be present in an electrical contactor, relay, or various other applications, may be modeled as an inductive device. In such devices, DC current tends to greatly increase power consumption. Thus, in one preferred embodiment of the present invention, the wave shaping device is configured to limit the modified alternating current signal applied across the coil assembly to limit current flow in the coil assembly, thereby limiting system power consumption.

The reduced current, although maintaining a sufficient effective magnetic force (due to its DC component) to engage the electrical contactor during the "steady state" operation, may be insufficient in some contactors to close the contactor during start up. Thus, a start up circuit is provided to allow the contactor to engage at start up while minimizing power consumption during steady state operation.

The method of the present invention generally comprises the steps of introducing a direct current component to an alternating current signal waveform provided by the alternating current power source and selectively applying at least part of the alternating current signal modified by the direct current component across the coil assembly, thereby generating an effective magnetic force greater than an effective magnetic force resulting from direct application of the alternating current signal across the coil assembly.

The accompanying drawings, which are incorporated and constitute part of this specification, illustrate various embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the remainder of the specification, which makes reference to the appended drawings, in which:

FIGS. 8A–8D are graphical representations of voltages and currents at respective selected points in the electrical contactor system as in FIG. 2 subject to an 80 volt RMS, 60 Hz applied alternating current signal;

FIGS. 9A–9D are graphical representations of voltages and currents at respective selected points in the electrical contactor system as in FIG. 2 subject to a 40 volt RMS, 60 Hz applied alternating current signal;

FIGS. 10A–10C are graphical representations of voltages and currents at respective selected points in the electrical contactor system as in FIG. 2 subject to a 20 volt RMS, 60 Hz applied alternating current signal;

FIGS. 11A–11C are graphical representations of voltages and currents at respective selected points in the electrical contactor system as in FIG. 2 subject to a 10 volt RMS, 60 Hz applied alternating current signal;

Figure 1:
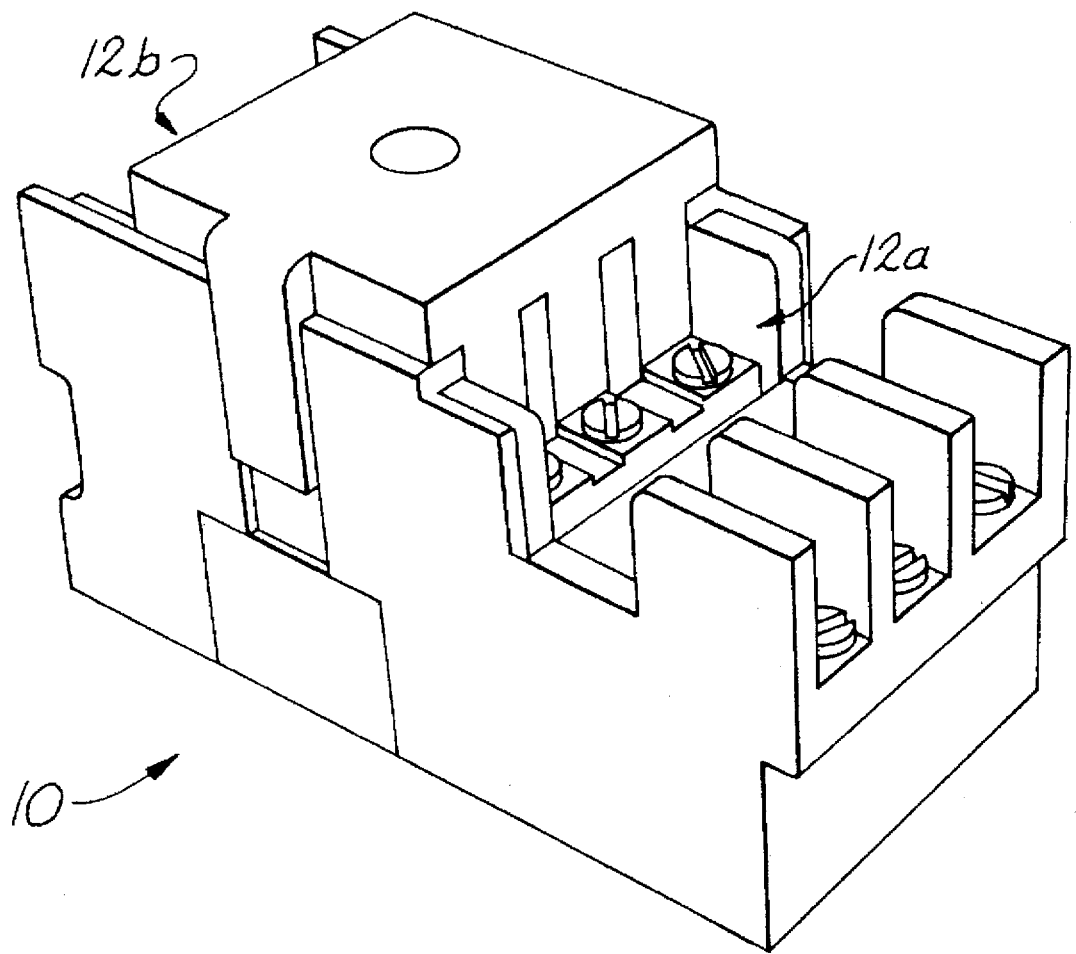
FIG. 1 is a perspective view of an AC electrical contactor.

Repeat use of reference characters in the present specification and drawings is intended to represent same or analogous features or elements of the invention.

DETAILED DESCRIPTION OF PREFERRED EMBODIMENTS

Reference will now be made in detail to the presently preferred embodiments of the invention, one or more examples of which are illustrated in the accompanying drawings. Each example is provided by way of explanation of the invention, not limitation of the invention. In fact it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention cover such modifications and variations as come within the spirit and scope of the appended claims and their equivalents.

Figure 2:
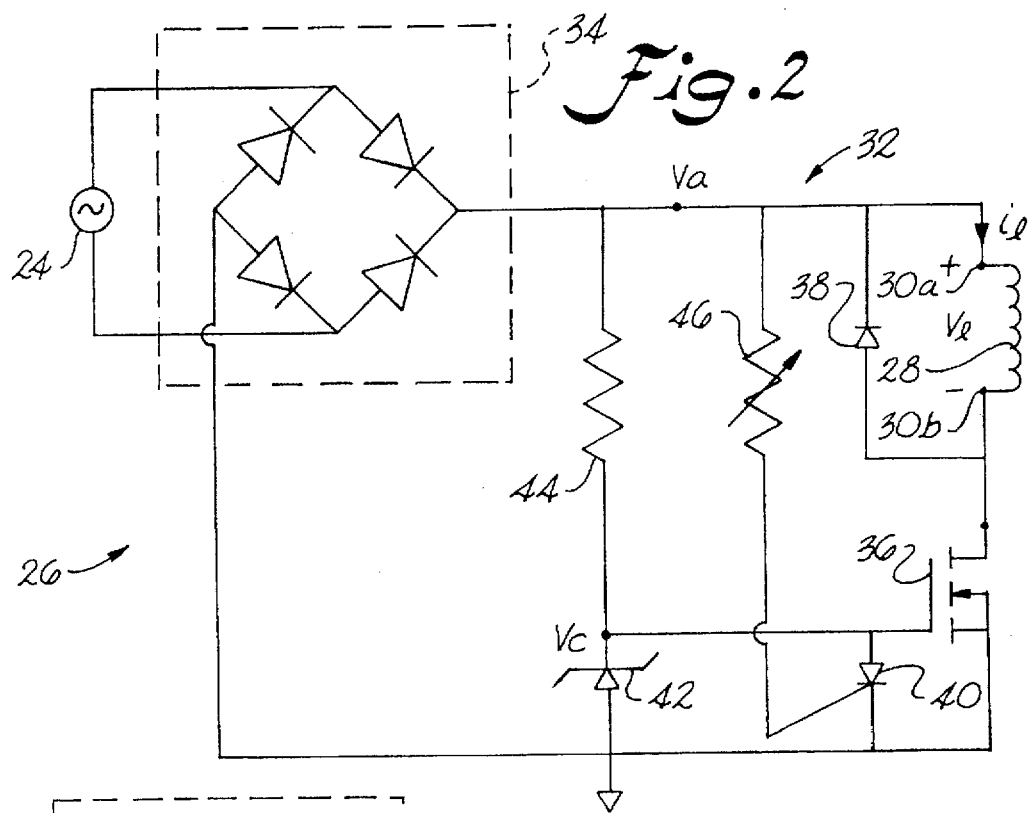
FIG. 2 is a diagrammatic representation of an electrical contactor system in accordance with the present invention.

Referring to FIG. 1, an electrical contactor 10 includes electrical contacts 12a and 12b (not visible) which may be electrically connected to an AC main power source and a load, such as industrial machinery. A solenoid switch housed within electrical contactor 10 provides selective electrical communication between the contacts 12a and 12b. The solenoid switch is activated by application of an alternating current signal by an alternating current power source 24 (FIG. 2).

As should be understood by those of ordinary skill in the art, the solenoid switch may include a ferromagnetic base core, for example in the shape of an "E". A coil is wrapped around the center arm of the E. An alternating current applied across the coil assembly generates a magnetic field which produces a magnetic flux density in the base core. The induced magnetism in the base core attracts a ferromagnetic arm situated above, and across, the arms of the E. Accordingly, when the alternating current signal is applied to the coil, the magnetized base core attracts the arm toward the base core into contact with the ends of the arms of the E. The arm is connected to a switch which, when closed, provides the desired electrical communication between contacts 12a and 12b.

Of course, an electrical contactor could be configured to open or to close a switch upon application of an alternating current signal to a solenoid switch. For ease of explanation, the electrical contactor as described herein is configured to close upon activation of the solenoid.

Figure 14:
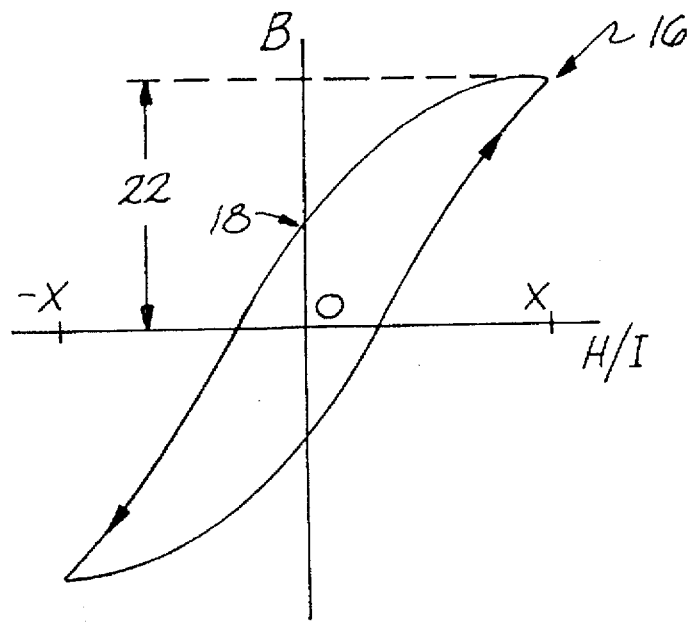
FIG. 14 is an exemplary graphical representation of magnetic flux density as a function of magnetic field strength resulting from an alternating current.

Referring now to FIG. 14, a hysteresis curve representing the magnetization of a ferromagnetic material is illustrated. It should be understood that the curve illustrated in FIG. 14 is exemplary of ferromagnetic materials generally, and is not presented as an illustration of the magnetization of a particular portion of the magnetic core of electrical contactor 10. For ease of explanation, however, the curve of FIG. 14 is suitable to explain a principle of the present invention.

FIG. 14 presents the magnetization curve as a measure of magnetic flux density B as a function of magnetic field strength H in the magnetic material. As described above, the magnetic field strength present in the core of electrical contactor 10 is proportional to the current applied to the solenoid. Thus, FIG. 14 may be considered to illustrate the magnetic flux density in a ferromagnetic material as a function of current applied to a coil inducing the magnetic field. In FIG. 14, magnetic flux density B is shown as current I varies between a value of —X and X.

FIG. 14 illustrates a steady state condition. From a start up position where current may be equal to 0, a path would exist from 0 to some point in the curve.

As can be seen from FIG. 14, the net magnetic flux density as the current varies between —X and X is equal to zero. As should be understood by those of ordinary skill in the art, however, a ferromagnetic material would be attracted by the resulting magnetic force whether the flux density is positive or negative. Thus, in a system having a flux density pattern as in FIG. 14, a net positive magnetic force would be applied to such material.

Although the magnetization curve for a core in an electrical contactor system may vary from the shape shown in FIG. 14, FIG. 14 is illustrative of the operating principle. In a voltage sag, however, current varies over a smaller current range than during normal operation. Thus, the average flux density during the voltage sag is lower than during normal operation. That is, the effective magnetic force holding the contactor in a closed position is reduced. If this effective magnetic force is reduced below the point required to keep the contactor closed, the contactor will open. For example, Applicant has found that a NEMA size 0 electrical contactor may disengage during a voltage sag to 70 v from a normal 120 v RMS input.

Additionally, those of ordinary skill in the art should understand that the point in the current cycle at which the voltage sag occurs may affect whether the sag will cause the contactor to disengage. Since, as discussed above, the magnetic flux density varies as the current varies, a voltage sag that the contactor would otherwise ride through may cause the contactor to disengage if the sag occurs at a point where the magnetic flux density is relatively low. Furthermore, other lapses in power quality, such as phase shifts or harmonics, might also cause a contactor to disengage when it would not disengage due to a drop in the magnitude of the input voltage alone. These power quality problems make prediction of electrical contactor performance difficult.

Figure 15:
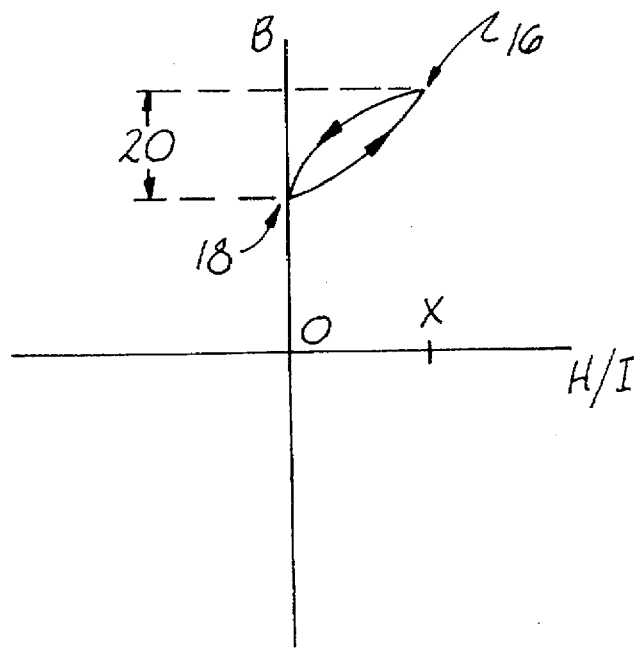
FIG. 15 is an exemplary graphical representation of magnetic flux density as a function of magnetic field strength resulting from a varying DC current.

FIG. 15 illustrates an exemplary hysteresis curve resulting from the addition of a DC component to the current as in FIG. 14 such that current I as shown in FIG. 15 varies between zero and X. The magnetism follows the upper part of the curve between points 16 and 18 as in FIG. 14. However, because current varies only between zero and X, core magnetism returns to point 16 by the bottom part of the curve of FIG. 15. In contrast, referring again to FIG. 14, when current varies between —X and X, magnetism follows the entire hysteresis curve as shown in FIG. 14.

Thus, due to the addition of the DC component, magnetic flux density remains within the region indicated at 20 in FIG. 15. In contrast, the positive portion of the hysteresis curve as shown in FIG. 14 varies within the region indicated at 22. Thus, the average magnetic flux density after the addition of the DC current component is greater than the average magnetic flux density resulting from the AC current signal illustrated in FIG. 14. The device is therefore able to ride through a larger voltage sag before the effective magnetic force drops below the point at which the contactor will disengage.

The current illustrated in FIG. 15 is a time varying current that is always positive. While this current may be considered to be a DC current, it is defined herein, for ease of explanation, as an AC current having a DC component. That is, an AC current is a time varying current having an average value of zero. An AC signal having a DC component is a time varying signal having a nonzero average value.

The above discussion presents a principal aspect of the invention. The addition of a DC current component to an AC current signal generating a magnetic flux density in a ferromagnetic material may result in a higher average magnetic flux density than would result from application of the AC signal alone.

As noted above, FIGS. 14 and 15 are illustrative of a principle which contributes to a primary benefit of the present invention. The curves presented in these figures permit a simplified explanation of this principle. As should be understood by those of ordinary skill in the art, however, the coil inductance of the solenoid of electrical contactor 10 causes an increase in current draw through the coil when a voltage having a DC component is applied. Thus, the actual magnetism curves experienced by the various preferred embodiments of the present invention will vary from the example provided in FIG. 15. Presently preferred embodiments of the invention are configured to limit such current draw while maintaining the ability of the contactor to withstand voltage sags. The principle discussed above, however, is still effective.

For ease of explanation, the solenoid devices discussed herein are parts of electrical contactor systems. It should be understood, however, that the present invention may be employed in other solenoid applications. Accordingly, referring to FIG. 2, an alternating current power source 24 is applied to an electrical contactor system 26. The solenoid coil is represented by inductor 28. Although a more sophisticated model for the contactor is possible, those of ordinary skill in the art should understand that the inductor model is sufficient for describing the function of the present invention. As should also be understood by those of ordinary skill in this art, the inductance of coil 28 will have different values depending on whether the contactor is engaged or disengaged. Specifically, the inductance will generally be much larger when the contactor is engaged than when it is disengaged. In either case, however, the inductor model is appropriate.

Power source 24 is an AC power source. In conventional AC electrical contactor systems, power source 24 would be applied directly across coil 28 at nodes, for example contacts, 30a and 30b.

Wave shaping device 32 introduces a direct current component to the alternating current signal provided by power source 24. Wave shaping device 32 outputs, as will be discussed in greater detail below, part of the alternating current signal, modified by the direct current component, across coil 28 at contacts 30a and 30b.

Bridge circuit 34 adds the DC component to the AC signal provided by power source 24. The rectified voltage applied across coil 28 would, alone, result in an increased effective magnetic force that would, as described above, enable the contactor to more effectively ride through voltage sags. However, since the rectified voltage has a nonzero average value, and since the current through coil 28 is proportional to the integral of the applied voltage, direct application of the rectified voltage across coil 28 causes an increase in current flow through the coil. Accordingly, power consumption is greatly increased. Applicant has determined that, using an NEMA size 0 electrical contactor such as manufactured by the Square D Corporation, the application of the rectified voltage directly across coil 28 results in an approximately 300 watt power consumption compared to a 3 to 4 watt consumption when power source 24 is applied directly across coil 28.

Accordingly, additional circuitry is provided to limit the modified AC signal applied across coil 28 to limit the current flow, thereby limiting system power consumption. As will be discussed in greater detail below, the present invention may be configured not only to compensate for the increased power consumption, but to consume less power than conventional electrical contactor systems alone. Because the DC component causes current buildup in the coil, an effective magnetic force sufficient to operate the contactor is maintained despite the limited application of the modified signal.

In the embodiment of the present invention illustrated in FIG. 2, transistor 36 limits current flow through coil 28 by limiting the application of the rectified voltage $v_a$ across coil 28. In this exemplary case, transistor 36 is an n-channel enhancement mode MOSFET that acts as a switch between contact 30b and ground. When on, transistor 36 behaves as a closed switch, effectively grounding contact 30b and applying the voltage between contact 30a and ground across coil 28. Thus, current produced by the rectified waveform $v_a$ will flow through coil 28.

"Ground" as used herein means ground as indicated in the circuits. That is, the voltages indicated in the circuit diagram are relative to the indicated circuit ground, which may itself be at some voltage with respect to exterior conditions.

When off, transistor 36 behaves as an open switch. Under these conditions, the voltage at 30b floats and will be determined by other influences in the circuit. As is discussed below, the voltage across coil 28 becomes slightly negative. Thus, the rectified waveform $v_a$ is not applied across coil 28. Of course, those of ordinary skill in this art will understand that various suitable means may be employed to control the application of the modified power source input signal across coil 28. Thus, while the opening and closing of transistor 36 is a preferred configuration, other suitable devices and configurations are understood to be within the scope and spirit of the present invention.

Accordingly, the state of transistor 36 determines whether $v_a$ is applied across coil 28. In particular, when transistor 36 turns off, free-wheeling diode 38 becomes forward biased, providing an alternate path for current to flow through coil 28 when transistor 36 is open-circuited and determining the voltage at contact 30b. The voltage across diode 38 helps establish the decay rate of current through coil 28 when transistor 36 is off.

The control system that in turn determines the state of transistor 36 centers around silicon controlled rectifier (SCR) 40. SCR 40 switches on to turn transistor 36 off when the rectified voltage $v_a$ exceeds a predetermined voltage level. It switches off to turn transistor 36 on when $v_a$ drops below a predetermined voltage level. This voltage level is determined by other elements of the control system. In particular, the current through variable resistor 46 establishes when SCR 40 turns on while the current determined by resistor 44 establishes when SCR 40 turns off.

Zener diode 42 limits the voltage across SCR 40 and limits the gate-to-source voltage across transistor 36 to the breakdown voltage for zener diode 42. The breakdown voltage would typically be a few volts higher than the turn-on voltage for transistor 36. This provides a sufficiently large gate-to-source voltage so that transistor 36 will effectively act as a closed switch when on while ensuring that the gate-to-source voltage is small enough that transistor 36 will not be damaged.

Resistor 44 provides a current path to cause zener diode 42 to go into breakdown when $v_a$ is greater than the diode's breakdown voltage. Additionally, resistor 44 establishes where SCR 40 will turn off on the negatively sloped potion of the $v_a$ waveform, as is illustrated below. Resistor 44 is the limiting element controlling current flow in SCR 40 once SCR 40 has switched on. The current through SCR 40 will decrease as voltage $v_a$ drops during the negatively sloped portion of the full-wave rectified waveform. At some point, the current through SCR 40 will drop below the minimum current necessary to keep the SCR in the conducting state. At that point, SCR 40 turns off and transistor 36 turns back on as $v_c$ rises. Thus, the value of resistor 44 establishes the magnitude of $v_a$ at which SCR 40 will turn off.

Current through variable resistor 46 establishes when SCR 40 turns on. Because voltage $v_a$ will be a full-wave rectified signal, current through resistor 46 will resemble a full-wave rectified signal. The resistance of resistor 46 is set so that this current reaches the required level to trigger SCR 40 at some point along the rising edge of the $v_a$ waveform. Thus, resistor 46 establishes where in the waveform SCR 40 turns on, which, in turn, establishes where in the waveform transistor 36 turns off.

In operation, wave shaping device 32 applies the rectified voltage $v_a$ across coil 28 only when the magnitude of $v_a$ is relatively small. This periodic application of voltage across coil 28 permits a build-up of current when transistor 36 is on and a drop in current when transistor 36 is off, thus resulting in a substantially stable current through coil 28 during steady state operation. It should be understood by those of ordinary skill in the art that the value of the components illustrated in FIG. 2 may be chosen to establish a current through coil 28 sufficient to generate an effective magnetic force capable of engaging the electrical contactor.

As discussed above, the embodiment of the present invention illustrated in FIG. 2 results in lower power consumption than is experienced with conventional electrical contactor systems. This is, generally, the result of two conditions. First, as discussed in greater detail above, the addition of a DC component to the AC signal increases the effective magnetic force generated by the solenoid. Thus, a lower magnitude coil current, and thus lower power consumption, is required to maintain an effective magnetic force sufficient to operate the contactor.

Second, the circuit illustrated in FIG. 2 is configured to apply a greater portion of the rectified voltage $v_a$ across coil 28 during a voltage sag than during normal operation. The increased duration of $v_a$ applied across coil 28 more than compensates for the decreased magnitude of $v_a$ during a voltage sag. Thus, current through coil 28 may actually increase during voltage sags, unless the voltage from power source 24 drops to very low levels. Thus, the effective magnetic force generated by the solenoid generally increases during the voltage sag. Since coil current increases during voltage sags, a lower current may be provided to the coil in steady state operation. The contactor is thereby protected from voltage sags while consuming less power during steady state operation than conventional contactors.

Although current through coil 28 will eventually begin to decrease as power source 24 drops to very low values, the net effect is that the contactor will remain engaged over a much wider voltage sag range than in conventional systems. For example, the circuit as in FIG. 2 may enable a NEMA size 0 AC electrical contactor to withstand a voltage sag to approximately 5.2 volts from a 120 volt RMS signal.

The performance of the steady state circuit as in FIG. 2 during normal operation and during voltage sags is illustrated in FIGS. 6A–12C. Each set of figures depicts waveforms measured at specific locations in the circuit of FIG. 2. Although a primary benefit of the present invention is the ability to effectively ride through voltage sags, those of ordinary skill in this art should understand that the present invention may also improve performance during other lapses in power quality, such as phase shifts. The figures will be discussed below with reference to the components of FIG. 2.

Referring to FIGS. 6A–6D, waveform 48 traces $v_a$ when power source 24 outputs a 120 volt RMS 60 Hz signal. Waveform 50 traces $v_c$. Waveform 52 traces the current through coil 28 ($i_l$). Waveform 54 traces the voltage across coil 28 ($v_l$). $V_a$ and $v_c$ are indicated relative to ground. $v_l$ is measured between contacts 30a and 30b.

Figure 6A:
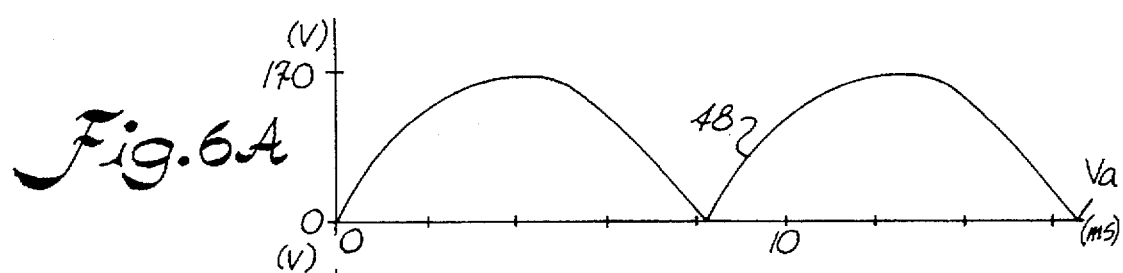
FIGS. 6A–6D are graphical representations of voltages and currents at respective selected points in the electrical contactor system as in FIG. 2 subject to a 120 volt RMS, 60 Hz applied alternating current signal.
Figure 6B:
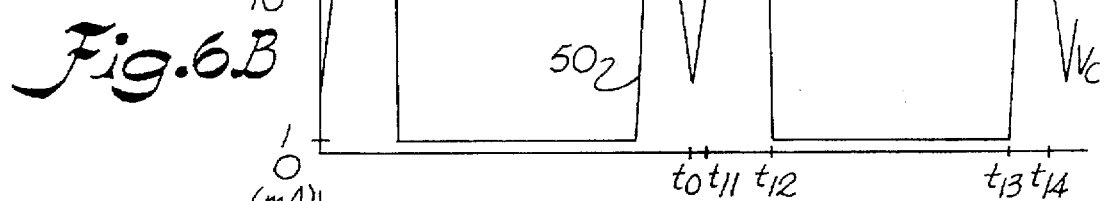

As indicated in FIG. 6A, $v_a$ is a full-wave rectified signal from the 120 volt RMS 60 Hz power source signal. Referring to the corresponding time plot of $v_c$ in FIG. 6B, there are four distinct time periods beginning with the occurrence of the first minimum on $v_a$ at t=0. For reference, these time periods are labeled in the second cycle of $v_a$ as $t_{11}$ through $t_{14}$. Between $t_0$ and $t_{11}$, zener diode 42 and SCR 40 are both off. Thus, there is essentially no current flow through resistor 44, and $v_c$ will approximate $v_a$. At time $t_{11}$, $v_a$ exceeds the breakdown voltage of zener diode 42. Thus, zener diode 42 goes into breakdown, limiting $v_c$ to the zener voltage of 10 volts.

Between $t_{11}$ and $t_{12}$ $v_a$ increases, and zener diode 42 remains in breakdown as the current through resistor 44 and zener diode 42 increases. Meanwhile, the current through resistor 46 increases as $v_a$ increases. At $t_{12}$, this current becomes large enough for SCR 40 to turn on, dropping $v_c$ to about 1 volt—the on-state voltage for SCR 40. $V_c$ is now too small for diode 42 to be in breakdown. Diode 42 therefore turns off, and the current through resistor 44 passes through SCR 40.

Between $t_{12}$ and $t_{13}$, the current through SCR 40 increases and decreases as $v_a$ increases and decreases. At $t_{13}$, the current through SCR 40 drops below the minimum holding current required to keep the SCR on. SCR 40 thus turns off, and $v_c$ rises until zener diode 42 goes into breakdown and once again limits $v_c$ to the zener breakdown voltage. The current through resistor 44 thus switches from SCR 40 to zener diode 42 at $t_{13}$.

Zener diode 42 is in breakdown between $t_{13}$ and $t_{14}$. Thus, $v_c$ is maintained at the zener voltage. During this interval, the current through the zener diode 42 and resistor 44 decreases as $v_a$ decreases. At $t_{14}$, $v_a$ drops below the zener voltage, and zener diode 42 leaves breakdown.

Between $t_{14}$ and the next minimum, zener diode 42 and SCR 40 are both nonconducting. There is no current flow through resistor 44, and $v_c$ approximates $V_a$.

The magnitude of $v_a$ and resistor 46 thus determines $t_{12}$ while the magnitude of $v_a$ and resistor 44 determine $t_{13}$. Together, these values determine when and how long transistor 36 will be on and off.

Figure 6C:
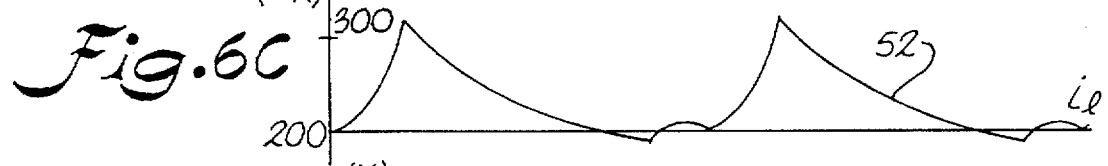
Figure 6D:
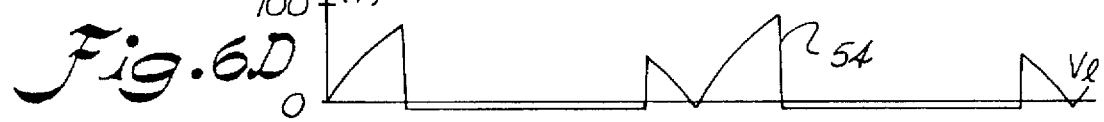
Figure 7A:
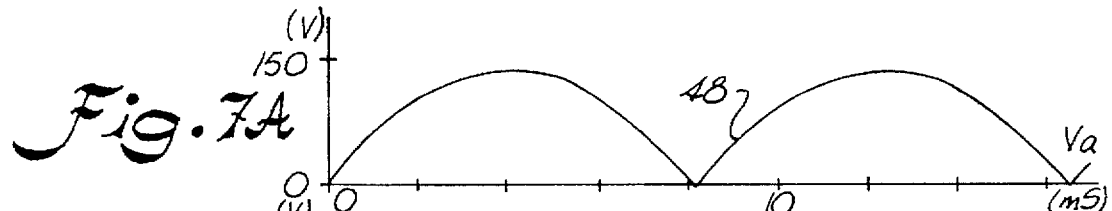
FIGS. 7A–7D are graphical representations of voltages and currents at respective selected points in the electrical contactor system as in FIG. 2 subject to a 100 volt RMS, 60 Hz applied alternating current signal.
Figure 7B:
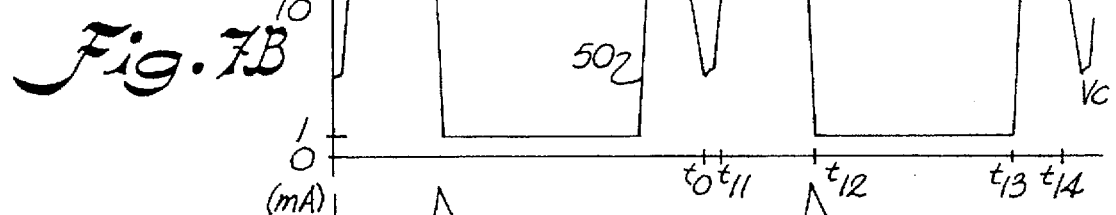
Figure 7C:
Figure 7D:
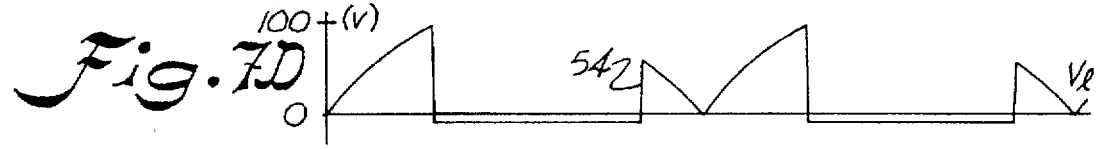

$I_t$ and $v_t$ are illustrated in FIGS. 6C and 6D, respectively. When transistor 36 is on, $v_t$ is approximately equal to $v_a$, leading to an increase in current ($i_t$) through coil 28 since $i_t$ approximately equals the integral of $v_t$ divided by the inductance of coil 28. When transistor 36 is off, $v_t$ goes slightly negative and $i_t$ decreases. Transistor 36 requires some minimum voltage at the gate to turn on. Thus, there are brief instants in time between $t_{14}$ and the next $t_{11}$ when transistor 36 is not fully on. The current decreases during these times as well.

Between $t_0$ and $t_{11}$, transistor 36 switches from off to on. When transistor 36 is off, the decreasing $i_t$ circulates through diode 38. When transistor 36 turns on, current is diverted from diode 38 to transistor 36, and $i_t$ begins to increase as transistor 36 becomes fully on at $t_{11}$.

Between $t_{11}$ and $t_{12}$, transistor 36 is on, and $v_t$ equals $v_a$. The current $i_t$ positively increases since $v_t$ is positive.

Between $t_{12}$ and $t_{13}$, transistor 36 is off, again causing $i_t$ to circulate through diode 38. $V_t$ is slightly negative because diode 38 is forward biased. Thus, $i_t$ decreases during this interval. Between $t_{13}$ and $t_{14}$, transistor 36 is on, and $v_t$ equals $v_a$. $I_t$ increases since $v_t$ is positive.

Between $t_{14}$ and the next minimum of $v_a$, transistor 36 is off. $I_t$ continues to increase slightly before transistor 36 turns off but eventually starts to decrease as transistor 36 turns off and it begins to circulate through diode 38.

As discussed above, the waveforms illustrated in FIGS. 6A–6D are dependant upon the values of the components of FIGS. 2. For example, resistor 46 may be adjusted to adjust the average value of the current $i_t$. Specifically, an increase in the value of resistor 46 increases the time between $t_{11}$ and $t_{12}$, increasing the integral of $v_t$ and, thus, current $i_t$.

FIGS. 7A–7D, 8A–8D, 9A–9D, 10A–10C, 11A–11C, and 12A–12C illustrate $v_a$, $v_c$ and $i_t$ for input signals from power source 24 equalling 100, 80, 40, 20, 10 and 5.2 volts RMS, respectively. These figures illustrate that as the power source voltage decreases, the time between $t_{11}$ and $t_{12}$ increases, causing transistor 36 to be in an on state for a longer period of time. This causes the area under the $v_t$ curve to increase, causing current $i_t$ to increase. That is, as the voltage from power source 24 decreases, the current through coil 28 increases. Thus, in presently preferred embodiments, the effective magnetic force keeping the electrical contactor engaged may actually increase during a voltage sag.

Of course, at some point the peak RMS value of the input signal from power source 24 will be smaller than that required to turn on SCR 40. This is approximately the condition illustrated in FIGS. 9A–9D, 10A–10C, 11A–11C and 12A–12C. Under these conditions, transistor 36 is always on, and the average current flow $i_t$ through coil 28 will be determined primarily by voltage $v_a$. Thus, under these conditions, $i_t$ decreases, due to losses associated with coil resistance, as the RMS value of the power source input voltage decreases.

FIGS. 6A through 12C show the steady state response of the circuit in FIG. 2 as the RMS value of the power source voltage decreases. Lapses in power quality usually manifest themselves as brief decreases in the RMS voltage value which may occur at any point in the waveform and which may also include an abrupt shift in phase. The return to normal power may also occur at any point in the waveform.

A voltage sag applied to the circuit in FIG. 2 causes $i_t$ to gradually transition from one steady state condition to the next. For example, if a lapse in power quality caused the power source voltage to drop from 120 volts RMS to 40 volts RMS, $i_t$ would, within a cycle or two, transition from the 120 volt RMS $i_t$ as shown in FIG. 6C to the 40 volt RMS $i_t$ as shown in FIG. 9C. Although the waveform for $i_t$ would change during a lapse in power quality, the average value of $i_t$ would always be sufficient to maintain contactor engagement.

Figure 12A:
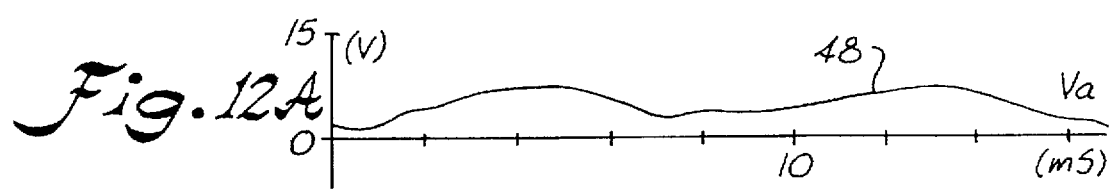
FIGS. 12A–12C are graphical representations of voltages and currents at respective selected points in the electrical contactor system as in FIG. 2 subject to a 5.2 volt RMS, 60 Hz applied alternating current signal.
Figure 12B:
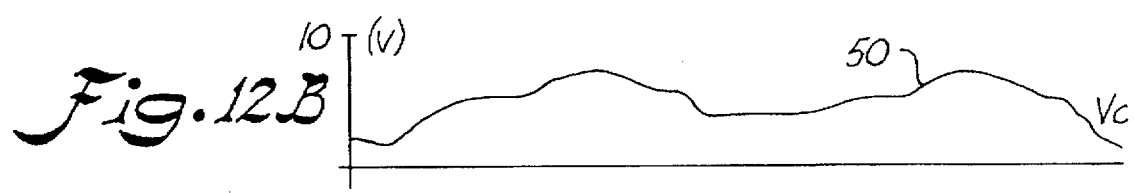
Figure 12C:
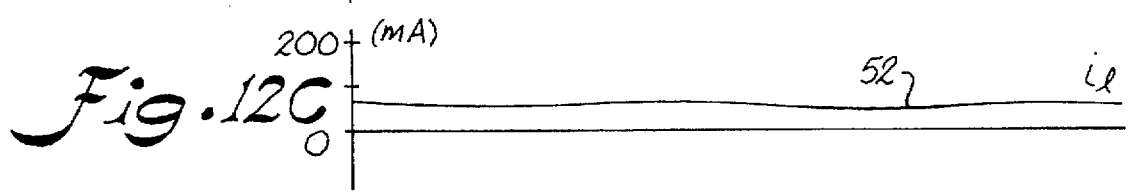

FIGS. 12A–12C illustrate the circuit response at 5.2 volts RMS 60 Hz. Below this point, $i_t$ decreases below the point necessary to maintain an effective magnetic force sufficient to maintain engagement of the contactor.

THE START UP CIRCUIT

FIG. 2 illustrates a steady state circuit. That is, the components in FIG. 2 determine the operation of the system after the electrical contactor has been engaged. As discussed above, however, the system may be configured in steady state operation to draw less current, and thus consume less power, than conventional electrical contactor systems. As should be understood by those of ordinary skill in the art, contactors require more current to engage than to remain engaged. If the configuration of the steady state circuit in FIG. 2 is such that insufficient current is drawn through coil 28 to initially engage the contactor, a start up circuit may be added to allow the contactor to engage at start up while still minimizing power consumption during steady state operation.

Figure 3:
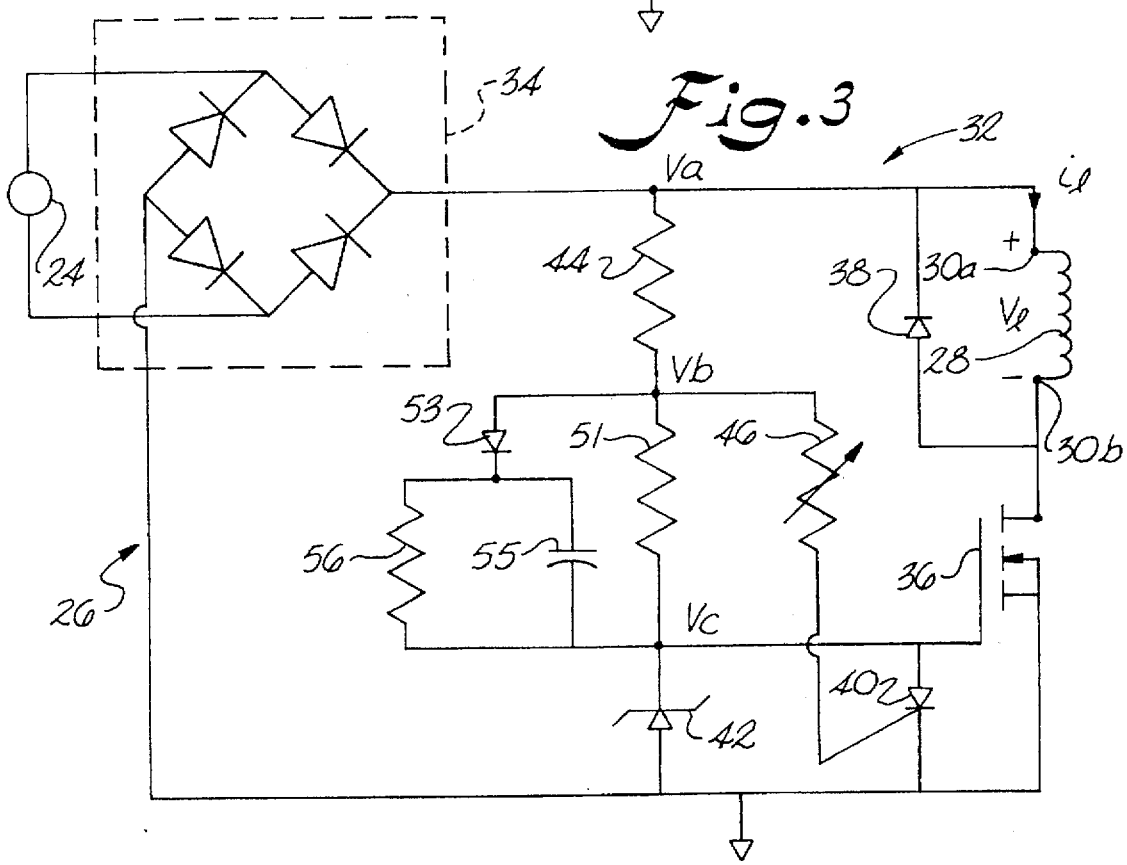
FIG. 3 is a diagrammatic representation of an electrical contactor system in accordance with the present invention including a start up circuit.

The components of an exemplary start up circuit are illustrated in FIG. 3. This circuit permits $v_a$ to be applied across coil 28 for a longer period of time at start up than during steady state. The greater exposure to $v_a$ creates greater current flow through the coil, resulting in a larger effective magnetic force. This enables the contactor to initially engage. The circuit then enters the steady state operation described above.

SCR 40 and resistor 46 perform the same functions in start up as during steady state operations discussed above with respect to FIG. 2. Furthermore, the series combination of resistor 44 and resistor 51 perform the same function as resistor 44 as described above with respect to FIG. 2 in a steady state condition.

Resistor 44 and resistor 51 create a voltage divider resulting in a voltage $v_b$ that is less than $v_a$. $V_b$ also includes the voltage divided zener voltage. Thus, the steady state wave shape at $v_b$ will resemble a full wave rectified waveform riding on top of a constant voltage. Resistor 46 may be set to cause SCR 40 to turn on at any point along the $v_a$ waveform. The turn-on voltage should be set to occur at some point where $v_b$ is greater than the zener voltage.

Voltage $v_b$, in conjunction with resistor 46, establish when the current through resistor 46 becomes large enough to trigger SCR 40. The voltage $v_a$ will be a full-wave rectified signal, and thus the current through resistor 46 will resemble a full-wave rectified signal. The resistance of resistor 46 is set so that this current reaches a required level to trigger SCR 40 at some point along the rising edge of the $v_b$ waveform. Thus, resistor 46 establishes where in the waveform SCR 40 turns on, which, in turn, establishes where in the waveform transistor 36 turns off.

Diode 53 is oriented so that the forward biased current through the diode is always positive. This allows capacitor 55 to charge through diode 53 but to discharge only through resistor 56.

At start up, capacitor 55 is presumed to be initially discharged. When power is first applied, capacitor 55 begins charging through resistor 44 and zener diode 42. This provides an alternative path between $v_b$ and $v_c$ other than through resistor 51, effectively shorting out resistor 51 during the start up transient. This limits $v_b$, for a period of time, to a value below the critical value required for the current through resistor 46 to become large enough to turn SCR 40 on. This causes transistor 36 to be on for a longer period of time, allowing current through coil 28 to increase rapidly. The RC time constant is selected to be long enough to allow the contactor to engage before SCR 40 begins controlling transistor 36.

At some point, the capacitor will become sufficiently charged so that the majority of current will flow through resistor 51 instead of through diode 53. At that point, the circuit enters the steady state mode of operation as described above with respect to FIG. 2.

Resistor 56 is a large resistor that is used to discharge capacitor 55 to reset the start up circuit. The value of resistor 56 is not critical, but it should be large compared to resistor 51 so that current will go through resistor 51 rather than resistor 56 during steady state. Also, the time constant of resistor 56 and capacitor 55 should be sufficiently longer than one cycle so that the start up circuit does not reset during steady state operation. The time constant should be set short enough so that the start up circuit will sufficiently reset at a power outage but sufficiently long so that the circuit will not undesirably reset at a voltage sag. Thus, the time constant should depend on the particular application in which the circuit is employed.

The start up circuit allows the gating action of SCR 40 to control transistor 36 during steady state operation while disabling SCR 40 when power is first applied. Current builds rapidly in coil 28 when SCR 40 is disabled. Thus, the contactor gets a large initial current boost, causing the contactor to engage. SCR 40 is disabled because the charging capacitor prevents $v_b$ from rising to the critical voltage required for the current through resistor 46 to become large enough to turn on SCR 40. Once charged, diode 53 prevents the capacitor from discharging through resistor 51. Discharge is instead controlled by resistor 56.

Accordingly, the start up circuit automatically controls the gate voltage of transistor 36 to establish when, and how long, the transistor will be turned on. It allows transistor 36 to turn on for a longer time period when the circuit is first powered than during steady state operation. This causes a large initial current to flow in coil 28 to engage the contactor. The current is then automatically decreased to an acceptable steady state value.

CIRCUIT ENHANCEMENTS

Some electrical contactor applications may require start up and/or steady state current levels that would provide damaging stresses to some components illustrated in the circuit of FIG. 3. One solution to such a problem would be to employ larger, more rugged devices. However, less costly components may be used within the present invention to circumvent potentially damaging operating conditions.

Possible damage could result from substantial, largely uncontrolled current flow in transistor 36 during start up and during lapses in power quality. Additional circuitry can be utilized to place upper limits on the current flow through transistor 36.

In particular, feedback may be utilized to eliminate undesirable current increase. Although two preferred feedback schemes will be discussed below, it should be understood that various suitable configurations are possible within the scope and spirit of the present invention.

Figure 4:
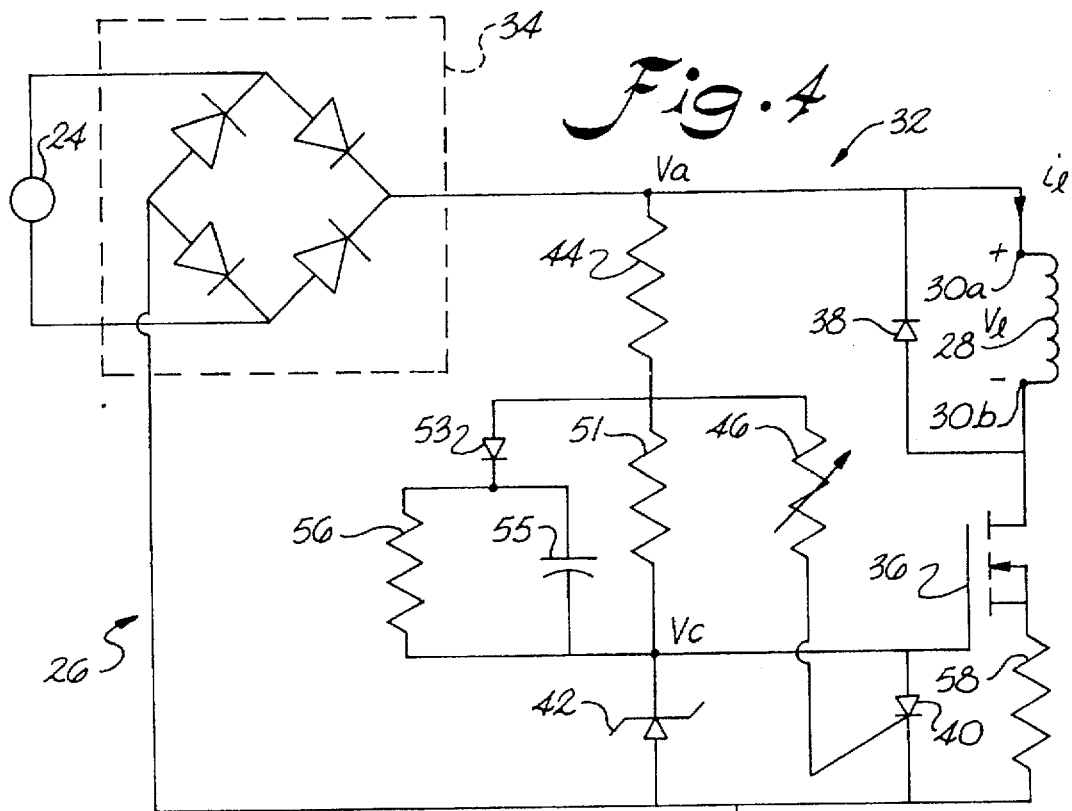
FIG. 4 is a diagrammatic representation of an electrical contactor system in accordance with the present invention including a feed back circuit.

Referring to FIG. 4, a resistor 58 is placed between the source of transistor 36 and ground. The voltage across resistor 58, which is also the source voltage for transistor 36, will thus be proportional to the current through transistor 36. The source voltage will rise as the source current increases, decreasing the gate-to-substrate voltage of transistor 36. The drain-to-source voltage across transistor 36 will increase when the gate-to-substrate voltage decreases. This ultimately causes the voltage across coil 28 to decrease to zero, causing the current through coil 28 to stabilize.

Figure 5:
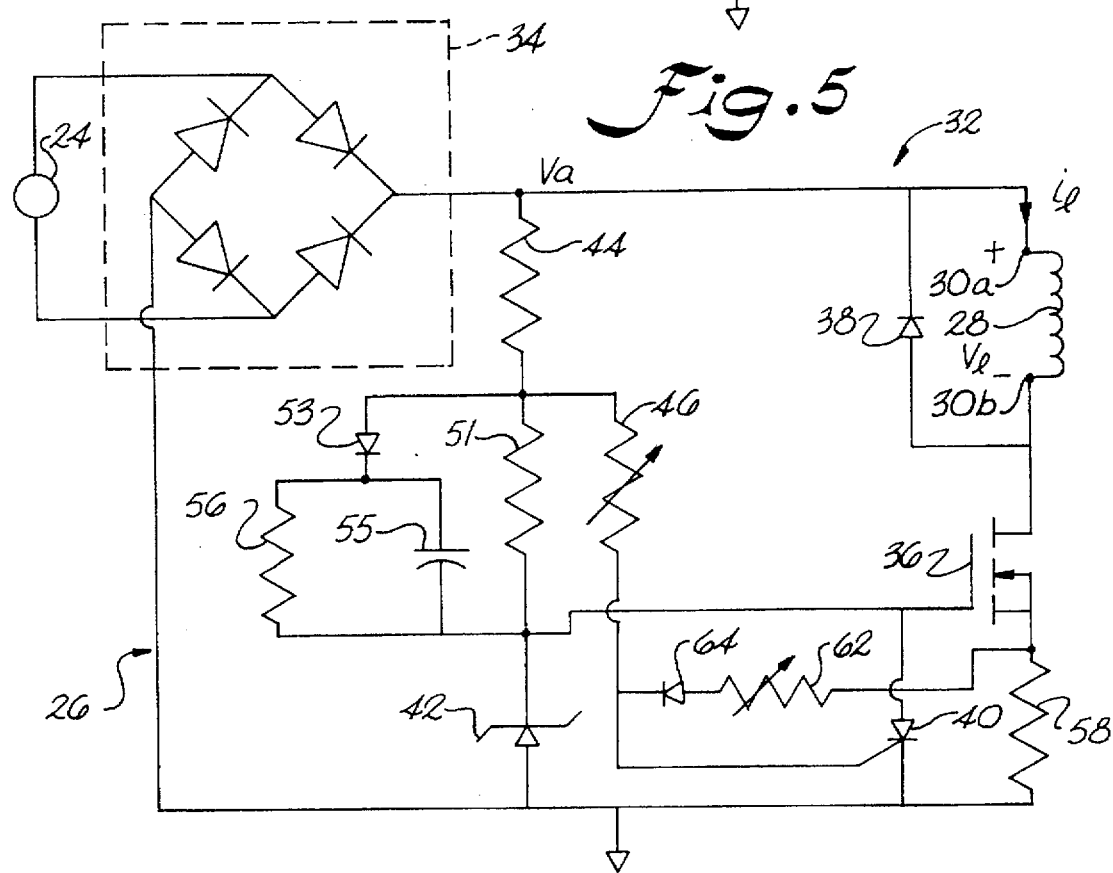
FIG. 5 is a diagrammatic representation of an electrical contactor system in accordance with the present invention including a feed back circuit.

The feedback scheme illustrated in FIG. 4 provides an upper limit for current through transistor 36 but may also require transistor 36 to dissipate potentially significant power. Accordingly, a second feedback scheme illustrated in FIG. 5 limits current through transistor 36 without requiring appreciable power dissipation. As in the circuit illustrated in FIG. 4, a resistor 58 is placed between the source of transistor 36 and the ground. Thus, the voltage across resistor 58 is proportional to the current through transistor 36.

The source voltage of transistor 36 provides an alternative turn on voltage for SCR 40. A resistor 62 and diode 64 attach the source of transistor 36 to the gate of SCR 40. This causes SCR 40 to turn on whenever the current through transistor 36 becomes too large. The current will begin to diminish once the SCR 40 has turned on.

Figure 13:
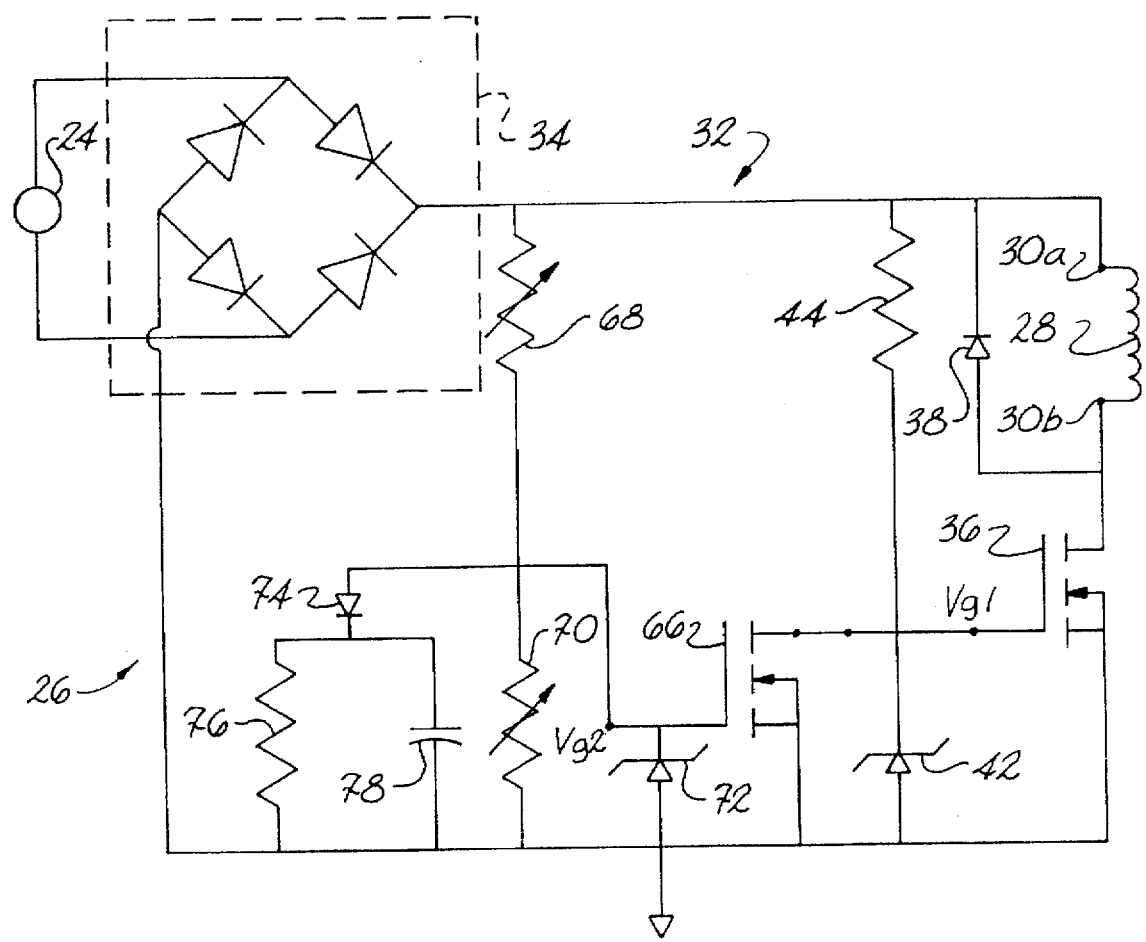
FIG. 13 is a diagrammatic representation of an electrical contactor system in accordance with the present invention.

A further preferred embodiment of the present invention, as illustrated in FIG. 13, utilizes two n-channel MOSFETs in place of the MOSFET and SCR configuration shown FIG. 2. The design illustrated in FIG. 13 provides both start up and steady state operation and accommodates large contactors.

Transistor 36, diode 38, coil 28, resistor 44 and zener diode 42 perform the same functions as their counterparts in the configuration shown in FIG. 2. Transistor 66 replaces SCR 40 in that it controls the state of transistor 36. Variable resistors 68 and 70 and zener diode 72 control the state of transistor 66. With resistor 68, diode 74, resistor 76 and capacitor 78 perform the start up function by initially shorting resistor 70.

In operation, transistor 36 again behaves as either a short or an open circuit between its source and drain. The gate-to-source voltage for transistor 36 is identified as $v_{g1}$. Transistor 36 is open if $v_{g1}$ is less than the transistor's turn-on voltage and is shorted if $v_{g1}$ is greater than the turn-on voltage. $V_{g1}$ is established by the voltage output from bridge circuit 34 but is limited by zener diode 42. Because, however, $v_{g1}$ may be modified by transistor 66, transistor 66 establishes the state of transistor 36.

The gate-to-substrate voltage of transistor 66 ($v_{g2}$) is controlled by the voltage divider formed by resistors 68 and 70. Transistor 66 is open between its source and drain if $v_{g2}$ is less than the transistor's turn-on voltage and is shorted if $v_{g2}$ is greater than the turn-on voltage. Zener diode 72 limits $v_{g2}$ to prevent damage to transistor 66. $V_{g2}$ increases as the input voltage increases. For small values of $v_{g2}$ transistor 66 is off, permitting transistor 36 to turn on. At some point, $v_{g2}$ becomes large enough to turn transistor 66 on, causing transistor 36 to turn off. Thus, resistors 68 and 70 establish the input voltage that causes transistor 66 to turn on and transistor 36 to turn off. This behavior permits tandem control of transistor 36 for both the rising and falling edges of the input voltage. In practice, there is some difference between the voltage at which transistor 66 turns on and off.

At start up, capacitor 78 is initially uncharged. When the input signal from power source 24 is first applied, current through resistor 68 charges capacitor 78 through diode 74, thus limiting $v_{g2}$ and preventing transistor 66 from turning on. Capacitor 78 and resistor 68 establish an RC time constant that determines how long $v_{g2}$ is limited. Thus, capacitor 78 and resistor 68 determine how long transistor 36 permits the entire rectified output of bridge circuit 34 to be applied across coil 28. This permits current through coil 28 to build to the point where the contactor will engage.

Transistor 66 eventually turns on as the voltage across capacitor 78 increases. At this point, the system enters the steady state condition.

The speed at which node 30b is transitioned to ground determines the speed at which current flow transitions in coil 28. If this transition is too fast, an inductive kickback may occur across the coil. To prevent this, diode 38 may be a fast recovery diode.

Similarly, an inductive kickback may occur across the input power source due to induction of the power lines. To reduce this problem, the speed at which transistor 36 transitions may be reduced. For example, a capacitor may be installed in parallel with zener diode 42 to increase to gate-to-substrate capacitance of transistor 36. A resistor may be installed between transistor 66 and transistor 36 to establish a time constant. Such configurations decrease the rate of current change in the input power lines and may substantially eliminate the inductive kickback at both the power source and the coil.

Those of ordinary skill in the art should understand that the values of the various components used in the preferred embodiments may depend upon the particular application in which the invention is employed. For example, referring to FIG. 1, the value of resistor 44 should be chosen depending at least in part on the specifications of the particular SCR used for SCR 40. Values for some components, such as zener diode 42, are not critical.

While various preferred embodiments of the invention have been described above, it is to be understood that any and all equivalent realizations of the present invention are included within the scope and spirit thereof. Thus, the embodiments depicted are presented by way of example only and are not intended as limitations upon the present invention. Thus, while particular embodiments of the invention have been described and shown, it will be understood by those of ordinary skill in this art that the present invention is not limited thereto since many modifications can be made. For example, various suitable devices may be employed to introduce a DC component to the power source input signal and to control application of the modified signal across the coil. Additionally, the device used in some preferred embodiments to switch the output node of the coil to and from ground need not be a transistor. It could be, for example, an SCR or, possibly, a mechanical switching device. Of course, the control circuitry may change depending upon the particular switching device. Thus, all suitable configurations should be understood to be within the scope of the present invention. Furthermore, the invention may be realized as a retrofit application to a conventional electrical system as well as an integrally constructed system. Therefore, it is contemplated that any and all such embodiments are included in the present invention as may fall within the literal or equivalent scope of the appended claims.

What is claimed:

1. An electrical solenoid system for use with an alternating current power source, said system comprising:
   a solenoid device including an electromagnetic coil assembly configured to generate a non-zero effective magnetic force in response to an alternating current signal applied across said coil assembly; and
   a wave shaping device including
      (a) a DC component circuit configured to receive an alternating current signal and to introduce a direct current component to said alternating current signal, and
      (b) a limiting mechanism in communication with said DC component circuit and said solenoid device said limiting mechanism being configured to apply said alternating current signal modified by said direct current component across said coil when the voltage magnitude of said modified alternating current signal is below a first predetermined level and to limit said modified alternating current signal applied across said coil when said voltage magnitude is above a second predetermined level.

2. The system as in claim 1, wherein said electrical solenoid system includes an electrical contactor that includes said solenoid device, said solenoid device having a switch proximate said coil assembly configured to operate responsively to the effective magnetic force.

3. The system as in claim 1, wherein said wave shaping device includes an alternate current path from said coil assembly when the modified alternating current signal is not applied across said coil assembly.

4. The system as in claim 1, wherein said wave shaping device is configured to limit the magnitude of the modified alternating current signal applied across said coil assembly only after a predetermined period following initial application of the alternating current signal to said wave shaping device, thereby permitting increased initial current flow in said coil assembly.

5. The system as in claim 1, wherein said wave shaping device includes a rectifier mechanism configured to rectify the alternating current signal, thereby introducing a direct current component to the alternating current signal.

6. The system as in claim 5, including a first node configured to convey current flow into said coil assembly and a second node configured to convey current flow out of said coil assembly, wherein said first node is connected to the output of said rectifier mechanism so that the rectified alternating current signal is applied to said first node and wherein said limiting mechanism is configured to around said second node when the voltage magnitude of the rectified alternating current signal is below said first predetermined level and to disconnect said second node from ground when the voltage magnitude of the rectified alternating current signal is above said second predetermined level.

7. The system as in claim 6, wherein said limiting mechanism includes a transistor device connected in series between said second node and the output of said rectifier mechanism so that when said transistor is in a conducting state the rectified alternating current signal is applied across said coil.

8. The system as in claim 1, including a first node configured to convey current flow into said coil assembly and a second node configured to convey current flow out of said coil assembly, wherein said modified alternating current signal is applied to said first node, and wherein said limiting mechanism is configured to limit the voltage across said first and second nodes, thereby limiting current flow in said coil assembly.

9. The system as in claim 8, wherein said limiting mechanism is configured to ground said second node when the voltage magnitude of the modified alternating current signal is below said first predetermined level and to disconnect said second node from ground when the voltage magnitude of the modified alternating current signal is above said second predetermined level.

10. The system as in claim 9, wherein said limiting mechanism includes a transistor device connected between said second node and around such that when said transistor is in a conducting state said second node is grounded, and when said transistor is in a nonconducting state said second node is disconnected from ground, and wherein said limiting mechanism is configured to control said transistor to be in a conducting state when the modified alternating current signal is below said first predetermined level.

11. The system as in claim 10, wherein said limiting mechanism includes a diode mechanism connected between said first node and said second node, said diode mechanism configured to be in a reverse bias condition when said transistor is in a conducting state and to be in a forward bias condition when said transistor is in a nonconducting state such that when said transistor is in a nonconducting state current is conducted through said diode device from said second node.

12. The system as in claim 10, wherein said limiting mechanism is configured such that said transistor is in a conducting state when the alternating current signal is initially applied to said wave shaping device, and wherein said limiting mechanism is configured to turn said transistor to a nonconducting state in response to the modified alternating current signal only after a predetermined period following initial application of the alternating current signal to said wave shaping device, thereby permitting increased initial current flow in said coil assembly.

13. The system as in claim 1, wherein said first predetermined level and said second predetermined level are unequal.

14. The system as in claim 13, wherein said second predetermined level is greater than said first predetermined level.

15. An electrical contactor system for use with an alternating current power source, said system comprising:

an electrical contactor including an electromagnetic coil assembly configured to generate a non-zero effective magnetic force in response to an alternating current signal applied across said coil assembly, a first node configured to convey current flow into said coil assembly, a second node configured to convey current flow out of said coil assembly, and a switch proximate said coil assembly configured to operate responsively to the magnetic force; and a wave shaping device including
(a) a rectifier mechanism configured to rectify the alternating current signal provided by the alternating current power source, thereby introducing a direct current component to the alternating current signal, and
(b) a limiting mechanism configured to apply the rectified alternating current signal to said first node, to ground said second node when the voltage magnitude of the rectified alternating current signal is below a first predetermined level, and to disconnect said second node from ground when the voltage magnitude of the rectified alternating current signal is above a second predetermined level, thereby limiting current flow in said coil assembly.

16. The system as in claim 15, wherein said limiting mechanism includes a metal oxide semiconductor field effect transistor device (MOSFET) connected between said second node and around such that when said MOSFET is on said second node is grounded, and when said MOSFET is off said second node is disconnected from ground, and wherein said limiting mechanism is configured to turn said MOSFET on when the rectified alternating current signal is below said first predetermined level.

17. The system as in claim 16, wherein said limiting mechanism includes a diode mechanism connected between said first node and said second node, said diode mechanism configured to be in a reverse bias condition when said MOSFET is on and to be in a forward bias condition when said MOSFET is off such that when said MOSFET is off current is conducted through said diode device from said second node.

18. The system as in claim 16, wherein said limiting mechanism is configured such that said MOSFET is on when the alternating current signal is initially applied to said electrical contactor system, and wherein said limiting mechanism is configured to turn off said MOSFET in response to the rectified alternating current signal only after a predetermined period following initial application of the alternating current signal to said electrical contactor system, thereby permitting increased initial current flow in said coil assembly.

19. The system as in claim 15, wherein said limiting mechanism is configured such that, during a voltage sag that reduces the voltage magnitude of the rectified alternating current signal, the portion of the rectified alternating current signal applied across said first node and said second node increases such that the current flow in said coil assembly increases from the steady state level for at least a portion of the period from the beginning of the voltage sag until the entire rectified alternating current signal is applied, and wherein said limiting mechanism is configured to limit the increase in current flow from a voltage sag to a level at which components of said system are substantially protected from damage from excessive current flow.

20. A method of improving the performance of electrical contactors used with alternating current power sources during lapses in power quality, wherein an electrical contactor includes an electromagnetic coil assembly configured to generate a non-zero effective magnetic force in response to an alternating current signal applied across the coil assembly and a switch proximate the coil assembly configured to operate responsively to the effective magnetic force, said method comprising the steps of:

introducing a direct current component to an alternating current signal waveform provided by the alternating current power source;

applying the alternating current signal modified by the direct current component across the coil assembly when the voltage magnitude of the modified alternating currrent signal is below a first predetermined level; and limiting the modified alternating current signal applied across the coil assembly when the voltage magnitude of the modified alternating current signal is above a second predetermined level.

21. The method as in claim 20, wherein said limiting step includes providing an alternate current path from the coil assembly when the modified alternating current signal is not applied across the coil assembly.

22. The method as in claim 20, wherein said limiting step includes limiting the magnitude of the modified alternating current signal only after a predetermined period following initial application of the alternating current signal to the electrical contactor, thereby permitting increased initial current flow in the coil assembly.

23. The method as in claim 1, wherein, during said limiting step and during a voltage sag that reduces the voltage magnitude of the modified alternating current signal, the portion of the modified alternating current signal voltage waveform applied across the coil assembly is increased such that the current flow in the coil assembly increases from the steady state level for at least a portion of the period from the beginning of the voltage sag until the entire modified alternating current voltage waveform is applied across the coil assembly.

24. The method as in claim 23, wherein said limiting step includes limiting the increase in current flow from a voltage sag to a level at which components of the electrical contactor are substantially protected from damage from excessive current flow.

25. An electrical solenoid system for use with an alternating current power source, said system comprising:

a coil having a first node and a second node;

a rectifier mechanism receiving an alternating current signal from the alternating current power source and having an output connected to said first node of said coil;

a switch mechanism, convertible between an electrically conducting state and an electrically nonconducting state, connected in series between said second node and said alternating current power source so that when said switch is in said conducting state, the rectified alternating current signal output from said rectifier mechanism is applied across said coil and so that when said switch is in said nonconducting state, the rectified alternating current signal output from said rectifier mechanism applied across said coil is limited; and a control circuit in communication with the rectified alternating current signal and said switch mechanism, said control circuit maintaining said switch mechanism in a conducting state when the voltage magnitude of the rectified alternating current signal is below a first predetermined level and maintaining said switch mechanism in a nonconducting state when the voltage magnitude of the rectified alternating current signal is above a second predetermined level.

26. The system as in claim 25, wherein said switch mechanism includes a transistor controlled by said control circuit.

* * * * *

UNITED STATES PATENT AND TRADEMARK OFFICE
CERTIFICATE OF CORRECTION

PATENT NO.   : 5,734,543
DATED        : March 31, 1998
INVENTOR(S)  : Allen E. Turner It is certified that error appears in the above-identified patent and that said Letters Patent is hereby corrected as shown below:

Column 15, line 11 delete "around" and insert therefor --ground--

Column 17, line 33 delete "1" and insert therefor --20--.

Signed and Sealed this

Ninth Day of March, 1999

Attest:

Q. TODD DICKINSON

*Attesting Officer*  *Acting Commissioner of Patents and Trademarks*